(12) United States Patent
Scott (10) Patent No.: US 11,449,743 B1
(45) Date of Patent: Sep. 20, 2022

(54) DIMENSIONALITY REDUCTION FOR STATISTICAL MODELING

(71) Applicant: HRB Innovations, Inc., Las Vegas, NV (US)

(72) Inventor: Laurie Croslin Scott, Kansas City, MO (US)

(73) Assignee: HRB Innovations, Inc., Las Vegas, NV (US)

( * ) Notice: Subject to any disclaimer, the term of this patent is extended or adjusted under 35 U.S.C. 154(b) by 987 days.

(21) Appl. No.: 14/741,729

(22) Filed: Jun. 17, 2015

(51) Int. Cl.
*G06N 3/08* (2006.01)
*G06N 7/00* (2006.01)

(52) U.S. Cl.
CPC ............... *G06N 3/08* (2013.01); *G06N 7/005* (2013.01)

(58) Field of Classification Search
CPC .................................. G06N 3/08; G06N 7/005
See application file for complete search history.

(56) References Cited

U.S. PATENT DOCUMENTS

| | | | |
|---|---|---|---|
| 5,822,741 A * | 10/1998 | Fischthal ................. | G06K 9/62 705/31 |
| 2002/0103793 A1* | 8/2002 | Koller ................. | G06F 16/2462 |
| 2002/0127529 A1* | 9/2002 | Cassuto ................... | G09B 5/02 434/335 |
| 2004/0177030 A1* | 9/2004 | Shoham ................. | G06Q 30/02 705/38 |
| 2005/0097207 A1* | 5/2005 | Gluhovsky ........... | H04L 41/142 709/224 |
| 2005/0278322 A1* | 12/2005 | Fan ........................ | G06N 20/20 |
| 2006/0115145 A1* | 6/2006 | Bishop ................. | G06K 9/6296 382/155 |
| 2006/0161403 A1* | 7/2006 | Jiang ....................... | G06F 17/18 703/2 |
| 2007/0112618 A1* | 5/2007 | Krneta ................... | G06Q 10/04 705/20 |
| 2007/0192341 A1* | 8/2007 | Thomas ............. | G06F 16/2471 |
| 2008/0195650 A1* | 8/2008 | Lingenfelder ......... | G06N 20/00 |
| 2008/0279434 A1* | 11/2008 | Cassill ................... | G06Q 10/06 382/131 |
| 2011/0144958 A1* | 6/2011 | Flur ..................... | G06F 11/3608 703/2 |
| 2012/0284791 A1* | 11/2012 | Miller .................... | G06N 7/005 726/22 |

(Continued)

OTHER PUBLICATIONS

Zhang, G., Hu, M. Y., Patuwo, B. E., & Indro, D. C. (1999). Artificial neural networks in bankruptcy prediction: General framework and cross-validation analysis. European journal of operational research, 116(1), 16-32. (Year: 1999).*

(Continued)

*Primary Examiner* — Michael J Huntley
*Assistant Examiner* — Oluwatosin O Alabi
(74) *Attorney, Agent, or Firm* — Erise IP, P.A.

(57) ABSTRACT

Methods and a system for generating and employing dimensionality-reduction for generating statistical models. Traditionally, constructing models used for statistical analysis has been a laborious process requiring significant amounts of analyst input and processing time. Embodiments of the inventions address the above problem by providing an efficient method for pre-screening variable to automatically prune the dimensionality of the input space to a tractable size while retaining the most predictive power possible.

14 Claims, 3 Drawing Sheets

(56) References Cited

U.S. PATENT DOCUMENTS

| | | | | |
|---|---|---|---|---|
| 2013/0138428 | A1* | 5/2013 | Chandramouli | G06F 17/274 704/9 |
| 2013/0282320 | A1* | 10/2013 | Buyse | G06F 17/18 702/85 |
| 2014/0122248 | A1* | 5/2014 | Kuzama | G06Q 30/02 705/14.66 |
| 2016/0248794 | A1* | 8/2016 | Cam | H04L 63/1433 |
| 2017/0017882 | A1* | 1/2017 | He | G06N 99/005 |
| 2018/0081961 | A1* | 3/2018 | Nachlieli | G06K 9/6218 |

OTHER PUBLICATIONS

Gustafson, P. (2000). Bayesian regression modeling with interactions and smooth effects. Journal of the American Statistical Association, 95(451), 795-806. (Year: 2000).*

Zhang, X., Mesirov, J. P., & Waltz, D. L. (1992). Hybrid system for protein secondary structure prediction. Journal of molecular biology, 225(4), 1049-1063. (Year: 1992).*

Lopez-Paz, D., Hennig, P., & Schölkopf, B. (2013). The randomized dependence coefficient. Advances in neural information processing systems, 26, 1-9. (Year: 2013).*

Doquire, G., & Verleysen, M. (2013). Mutual information-based feature selection for multilabel classification. Neurocomputing, 122, 148-155. (Year: 2013).*

Yu, L., & Liu, H. (2003). Feature selection for high-dimensional data: A fast correlation-based filter solution. In Proceedings of the 20th international conference on machine learning (ICML-03) (pp. 856-863). (Year: 2003).*

Vaz, Ana Sofia, et al. "Can we predict habitat quality from space? A multi-indicator assessment based on an automated knowledge-driven system." International Journal of Applied Earth Observation and Geoinformation 37 (2015): 106-113. May 1, 2015 (Year: 2015).*

Janecek, Andreas. "Efficient feature reduction and classification methods." Wiem: Universitat Wien (2009). (Year: 2009).*

Blum Al, Langley P. Selection of relevant features and examples in machine learning. Artificial intelligence. Dec. 1, 1997;97(1-2):245-71. (Year: 1997).*

* cited by examiner

DIMENSIONALITY REDUCTION FOR STATISTICAL MODELING

BACKGROUND

1. Field

Embodiments of the invention generally relate to constructing statistical models and, more particularly, provide methods and systems for building neural networks usable to classify tax return being prepared in various ways.

2. Related Art

Traditionally, constructing models used for statistical analysis has been a laborious process requiring significant amounts of analyst input and processing time. In general, the problem of training a model such as a neural network NP-complete, and even the best approximation algorithms typically require time and space polynomial in both the number of data points in the learning set and the number of variables per data point. Because the time required to construct a model for a complex data set is so high, analysts and subject-matter experts are employed to prune the variables to those which they expect to have the most significant impact on the output of the model. However, this approach remains slow, and may fail to include significant variables with an unintuitive connection to the output of the model. Accordingly, automated techniques for rapidly and efficiently constructing models are needed.

SUMMARY

Embodiments of the inventions address the above problem by providing an efficient method for pre-screening variable to automatically prune the dimensionality of the input space to a tractable size while retaining the most predictive power possible. In a first embodiment, the invention includes a method of building a model for determining a relationship between a set of inputs and an output, comprising the steps of ingesting a plurality of data points, each data point comprising a plurality of input variables and an output variable; determining, across the plurality of data points, an individual predictive strength of each input variable for the output variable; determining, across the plurality of data points, a pairwise predictive strength of each pair of the input variables for the output variable; determining a prediction variable set of predetermined size, wherein the prediction variable set comprises those input variables and pairs of input variables with highest predictive strengths; and constructing a predictive model based on the prediction variable set.

In a second embodiment, the invention includes a system for detecting a fraudulent tax return, comprising a data store storing a plurality of data points, each data point associated with a tax return and comprising values for each of a plurality of input variables and an output variable associated with the likelihood that the tax return is fraudulent; a Bayesian expectation engine able to determine a likelihood of the output variable given one or more input variables; a prediction set generation engine able to generate a prediction variable set based on the output of the Bayesian expectation engine; a pruning engine operable to remove redundant variables from the prediction variable set; and a model generation engine operable to generate a model for estimating a likelihood that a candidate tax return is fraudulent based on the values of the input variables associated with the candidate tax return.

In a third embodiment, the invention includes a method for determining whether a candidate tax return is fraudulent, comprising the steps of submitting the candidate tax return to a fraud estimation model; receiving a fraud score from the fraud estimation model; based on the fraud score, classifying the return as fraudulent or non-fraudulent, wherein the fraud estimation model was created by a method comprising the steps of ingesting a plurality of data points, each data point corresponding to a tax return classified as fraudulent or non-fraudulent and comprising values for each of a plurality of variables; determining an individual predictive strength for each input variable by comparing the Bayesian likelihood of fraud for different values of the variable; determining a pairwise predictive strength for each pair of input variables by comparing the Bayesian likelihood of fraud for different values of the pair of input variables; determining a prediction variable set of predetermined size, wherein the prediction variable set comprises those input variables and pairs of input variables with highest predictive strengths; and constructing the fraud estimation model based on the prediction variable set.

This summary is provided to introduce a selection of concepts in a simplified form that is further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

I. Operational Environment for Embodiments of the Invention

Figure 1:
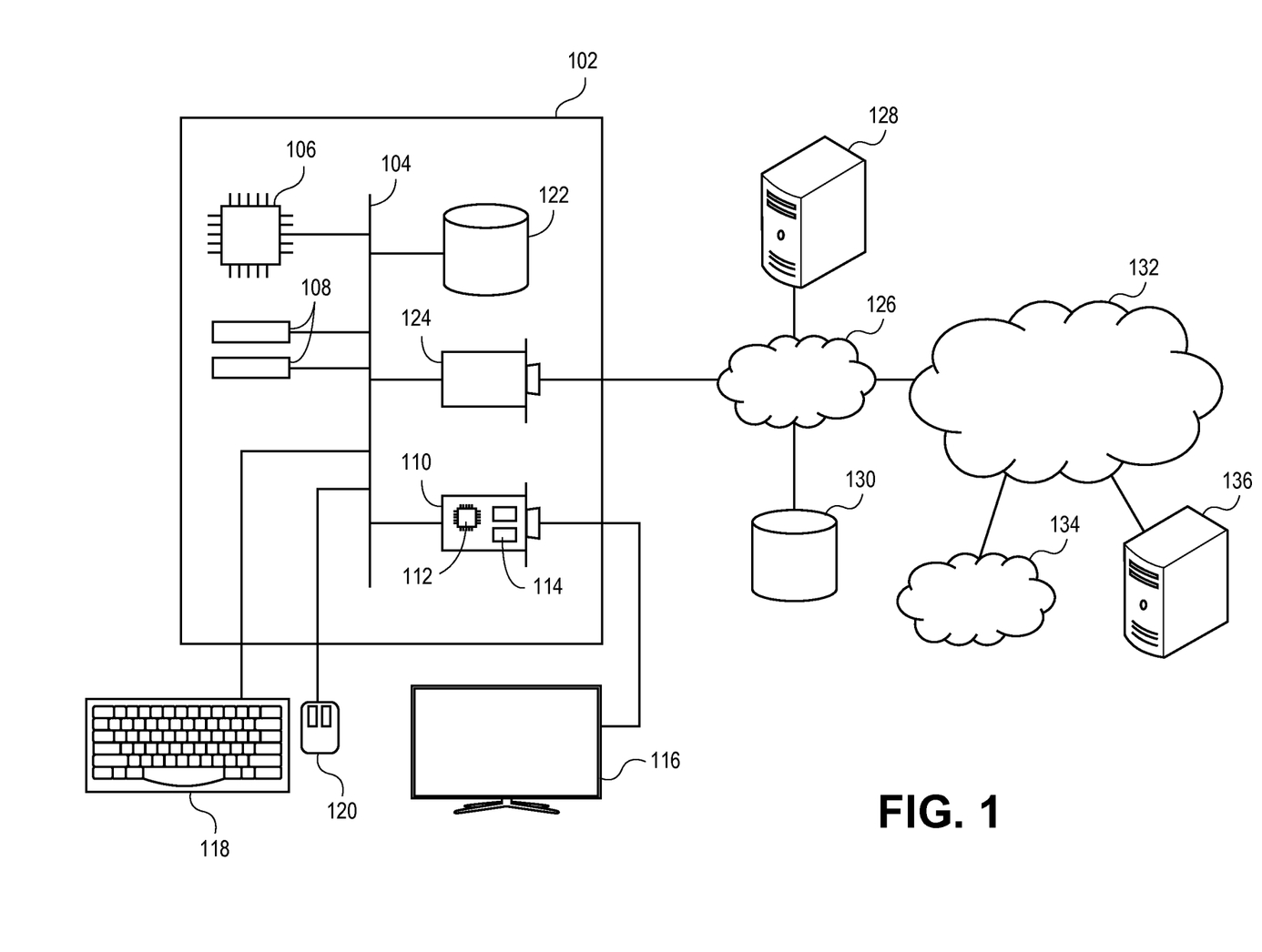
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

II. Operation of Embodiments of the Invention

Embodiments of the invention provide improved methods for constructing statistical models based on training data. At a high level, embodiments of the invention first ingest training data. Next, the relationship of each individual variable or combination of variables to the output of the model is determined. Once the variables with the largest contribution to the model have been determined, redundant variables are pruned from the prediction variables. Once the appropriate set of prediction variables has been determined, the model can be constructed based on the restriction of the training data to the variables in the prediction variable set.

Figure 2:
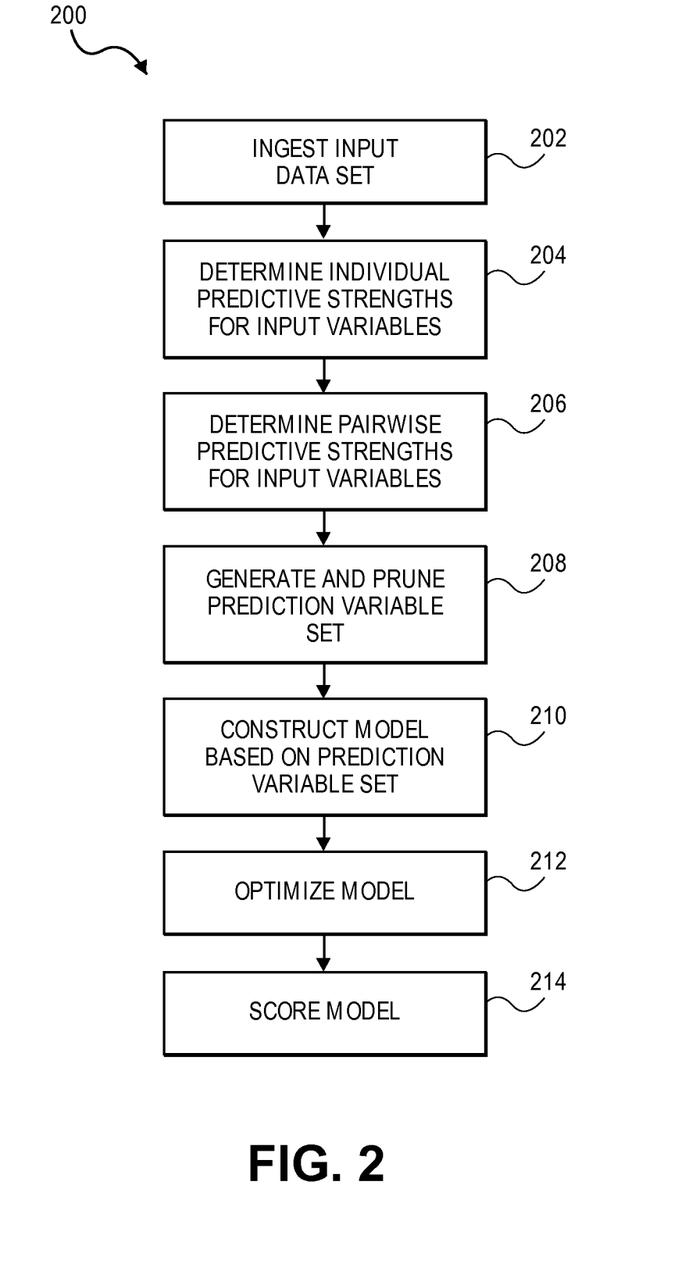
FIG. 2 depicts a method of constructing a statistical model in accordance with embodiments of the invention.

Turning first to FIG. 2, a method of constructing a statistical model in accordance with embodiments of the invention is depicted, and generally referred to by reference numeral 200. Initially, at a step 202, the training data is ingested. Broadly speaking, the input data includes a number of data points, each of which includes values for each of a number of variables. The number of variables for each data point may also be referred to as the dimension of the data set. It is an objective of the invention to reduce the dimension of the data set while retaining as much predictive power as possible.

Each variable may be continuous, multi-valued, or binary. A continuous variable may take on a broad range of values, a multi-valued variable takes on one of a small number of values, and a binary variable takes on one of two values. In some embodiments, it may be desirable to transform continuous and multi-valued variables into binary variables. This can be done for continuous variables by selecting one or more appropriate thresholds and creating binary variables corresponding to whether the value is above or below each of the thresholds. It can also be done for multi-valued variables by creating binary variables corresponding to whether the variable takes on each of the possible values.

In an exemplary embodiment, each data point may be associated with an individual tax return, and the variables may include the adjusted gross income of the taxpayer (an example of a continuous variable), the type of return (e.g. 1040, 1040-EZ, or 1040-A; an example of a multi-valued variable), whether the return is itemized (an example of a binary variable), the marital status of the taxpayer, the number of schedules included with the tax return, the total deduction claimed, whether the return was audited, and whether the return was determined to contain an error. In practice, the actual dimension of a data set may be much higher, such that hundreds or thousands of variables are present. Some data points may not have values for certain variables (for example, it might not be known whether a particular tax return contains an error).

In some embodiments, the variables may have unclear or even completely unknown semantics. It is an advantage of the invention that knowledge of the semantics of the input data set is not required for the operation of the invention. This allows both larger data sets and less work by subject-matter experts prior to constructing the model as compared to conventional modeling techniques.

For each model constructed, one or more data points are selected as output variables, with the remainder being input variables. For example, it may be desirable to determine the likelihood of a particular tax return being audited, based on all of the other points in the data set. In that case, the variable corresponding to whether the tax return was audited would be the output variable, and all of the other variables would be input variables. The same data set could also be used to determine the likelihood of a tax return containing an error, in which case the variable corresponding to whether the tax return was audited would be an input variable with all the others.

In various embodiments, different tasks needed before the predictive power of individual variables can be computed are also performed at this step. In some embodiments, individual variables may be centered and normalized. In other embodiments, singular variables (for example, those where all data points have the same value) are removed from the data set. In still other embodiments, redundant variables (for example, those variables which are too strongly correlated with another variable) can be removed at this step. If the model being constructed requires binary variables, then continuous variables can be thresholded appropriately at this point and multi-valued variables can be decomposed. Furthermore, data known to be non-predictive (for example, a variable that takes on the same value for all data points) can be removed at this stage to save processing time. Other necessary or desirable preprocessing steps can be conducted as will be apparent to one of skill in the art.

In some embodiments, a portion of the training data may be reserved as holdout data for subsequent scoring of the model eventually determined. This allows the accuracy of the model to be determined without regards to whether the data was overfitted to the training data, as the model is essentially blind to the data points in the holdout set.

Next, at a step 204, the individual prediction strength for each variable is determined. This can be done in a number of ways. In a first embodiment, the correlation of the input variable being tested and the output variable is calculated. In another embodiment, the log-log correlation of the input variable and the output variable is calculated. In still another embodiment, the Bayesian likelihood of the output variable when the input variable present is calculated and compared to the Bayesian likelihood of the output variable when the input variable is absent. In yet another embodiment, the covariance of the input variable and the output variable is used to determine the predictive strength for the output variable. Other methods of determining the predictive power of each input variable on the output variable, now known or later developed, are contemplated as being within the scope of the invention. In some embodiments, different measures of predictive strength may be used for different types of input variables. For example, the Bayesian likelihood may be used for binary input variables, while correlation may be used for continuous input variables.

Once the predictive strength of each individual variable on the output variable has been determined, processing proceeds to a step 206, where the pairwise predictive strength of each pair of input variables on the output variable is determined. As with step 204, any of a variety of measures of predictive strength can be employed for this determination. However, additional (or different) measures of predictive strength can be used in the multivariate context. For example, in the Bayesian case, the two-way Bayesian likelihood test can be used by direct analogy. Similarly, where correlation is used to calculate individual predictive strength, the coefficient of multiple correlation can be used to calculate the two-way predictive strength. Other predictive strength measures, such as the randomized dependence correlation, mutual information, or total correlation can also be used.

In some embodiments, the process of steps 204 and 206 can be extended to three-way predictive strength, or even further to N-way predictive strength of the input variables. The computational complexity (and accordingly the processing time) of each successive iteration increases and the marginal benefit will generally decrease, so a tradeoff exists between maintaining the maximum predictive power of the input data in the prediction variable set and the pre-processing time. For the sake of brevity, the discussion below will refer to "variables" and "pairs of variables;" however, it will be apparent to one of skill in the art how to extend this process to N-tuples of variables in additions to singletons and pairs.

Once the predictive power for each individual variable and combination of variables is determined, the prediction variable set can be determined at step 208. If the input data set is thought of as a spreadsheet where the rows are the individual data points and the columns are the variables, the prediction variable set can be thought of as a subset of columns which are particularly relevant. Thus, the input data set, when restricted to the prediction variables, maintains much of the predictive power of the input data set as a whole. In some embodiments, the prediction variable set is simply a fixed number of those individual variables and combinations of variables with the highest predictive strength for the output variable. Thus if 500 variables are present in the input data set, then 250,000 individual and pairwise variables will be examined, and the prediction variable set can be limited to 100 of these individual and pairwise variables. Because of the superlinear dependence of the model computation time on the number of variables, this five-fold reduction can significantly reduce the time needed to generate the model without appreciably reducing its predictive power. In other embodiments, the prediction variable set can be limited to a specified fraction of the number of variables in the input data set. For example, the prediction variable set size can be fixed at one-tenth of the dimension of the input data set. In still other embodiments, the prediction set size can vary, and consist of all other those variables with prediction strength over a given threshold. For example, all variables with a correlation coefficient higher than 0.65 could be included in the prediction variable set, regardless of the number of such variables. In yet other embodiments, the minimum predictive power of the resulting model can be specified, and method 200 can be iterated with increasing prediction set size until the desired predictive power is reached.

In some embodiments, the generation of the prediction variable set at step 208 includes a process of pruning the prediction variable set to remove redundant variables. In some embodiments if an element of the prediction variable set is a subset of another element of the prediction variable set, then the one with the lower predictive power will be removed from the prediction variable set. In other embodiments, the relationship (such as, e.g., the correlation) between each pair of members in the prediction variable set is computed, and the less predictive of each pair that are strongly related is removed.

In particular, if a particular variable has a high predictive strength, pairwise combinations of other variables with that variable may also have high predictive strength, but the joint predictive strength of the variable and the pairwise combination may not be significantly more than the variable alone. Similarly, if a pairwise combination of two variables has a high predictive strength, the two components may have individually high predictive strengths, but including them in the prediction variables set with the pairwise combination may not increase its predictive strength.

As another example, the process of removing redundancies may instead be performed by calculating the pairwise covariance of the variables in the prediction variable set. For independent or weakly related input variables, this covariance will be close to zero, while for redundant variables, it will have large absolute value. In practice, some embodiments may employ the Pearson product-moment coefficient (which is normalized to between −1 and 1) rather than the raw covariance so as to enable comparing each pair of members of the prediction variable set to a predetermined threshold. For example, if two members of the prediction variable set have a correlation coefficient greater than 0.9, then the one with the lower predictive power may be pruned and replaced by a new variable or pair of variables in the prediction set. Again, this process can be repeated until the redundant members have been removed from the set of prediction variables. One of skill in the art will appreciate that other measures of correlation or thresholds can also be used to prune redundant variable from the prediction variable set. In some embodiments, duplicate variables (i.e., variables that have different labels but identical values across all data points) may appear in the input data set. Such variables can also be detected and removed at this stage, either by the procedure described above, or by a pairwise comparison of the variables in the input data set.

Once the prediction variable set of the predetermined size has been generated, the model can be built at step 210 using any of a variety of techniques known in the art, depending on need and the desired output variable. For example, classifiers such as linear classifiers, support vector machines, random forests or neural networks can be used according to need where the output variable is binary or multivalued. If the output variable is continuous, least-squares regression, Bayesian linear regression, or non-parametric regression can be used. Other modeling techniques, now known or later developed, can be employed as well and are contemplated as being within the scope of the invention. Because the preceding steps have selected the most relevant subset of the variables, more computationally expensive methods can be employed due to the smaller input space. As such, clustering algorithms previously requiring extensive manual data manipulation prior to use can be employed for building models.

One modeling technique particularly well suited for use with the invention is that of neural networks. Neural networks have the advantage that they will eventually converge on the optimal combination of the inputs to model the output for a given data set. However, computing this model is extremely expensive. Even computing heuristic approximations can consume significant resources on moderately-sized data sets. Due to the superlinear nature dependence of the learning time for a neural network on the number of input variables, a reduction from 500 variables to the 50 most significant variables can reduce the necessary computation time by a factor of 1000 or more. Other techniques for building models also typically have a high time complexity in the number of variables and can therefore benefit from the variable prescreening process described above.

Next, at a step 212, the model is optimized to reduce running complexity. For example, certain combinations of input variables may be too infrequent in the data set to be statistically significant. In such a scenario, combinations of input variables varying in only the least significant component may be merged in the model. This can reduce both the evaluation time for the model and the risk of overfitting the input data. Because the input variables have been previously evaluated, they can be ordered and merging the least significant components is simplified. For example, if the model is a neural network, then the paths through the network can be ordered from the most significant information to the least significant information, and so, when the sample size is too small to be useful, the paths can be combined with the least possible impact to the overall fit. Finally, at a step 214, the model may be scored in some embodiments. For example, in those embodiments where a holdout set was reserved, the holdout data may be used to determine the accuracy of the model by comparing the predictions of the model as applied to the reserved data to the actual values of the output variable for the reserved data. Different model types will each have one or more corresponding scoring functions. For example, where the output is a binary variable, available scoring metrics include precision, recall, F-measure, and others. The optimal scoring metric for a model will be domain specific, and will be known to one of skill in the art.

Figure 3:
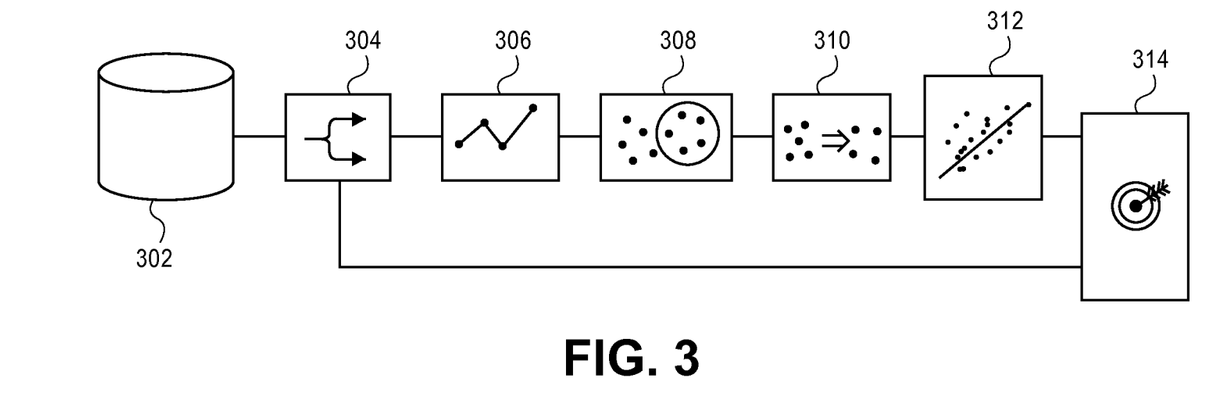
FIG. 3 depicts a system diagram illustrating the data flow in one embodiment of the invention.

Turning now to FIG. 3, a system diagram illustrating the data flow in one embodiment of the invention is depicted. Data store 302 initially stores the initial data set. As discussed above, the data set comprises a potentially large data set where each data point includes values for a number of variables. The precise number of data points and the number of variables will depend on the subject matter being modeled. For example, if the goal of a model is to determine whether a given credit card transaction is fraudulent, each data point may represent another credit card transaction that has been processed by the issuing bank. As such, the data points may number in the billions. Each variable in this application would then correspond to some piece of information tracked for that transaction. For example, the owner of the credit card, the merchant, the dollar amount, the time of day, day of week, zip code of the transaction, whether the transaction is a card-present or a card-not-present transaction could all be variables in the data set, along with many others. As another example, in a medical study, the output variable could be whether the patient has a particular medical condition (such as high blood pressure), while the input variables could include the patient's age, sex, race, weight, and a large number of other diagnostic factors. In either case, previous modeling techniques either require a subject-matter expert to guess which variables are relevant to the output or require too long to generate a model to do exploratory analysis of the data set.

This data in ingested by preprocessing engine 304. As discussed above with respect to step 202, in some embodiments, preprocessing the individual input variables may be necessary to normalize or scrub the input variables so that they can be processed by the expectation engine. Additionally, as an additional preprocessing step for those embodiments where it is practiced, a holdout set of the data can be split off at this point for subsequent scoring of the model once it has been generated based on the remaining data.

Once the necessary preprocessing, the preprocessed data set can be passed to expectation engine 306. Broadly speaking, it is the task of expectation engine to determine the predictive strength for a subset of the variables. In some embodiments, these subsets are individual variables and pairs of variables (i.e. the subsets of the set of variables of sizes one and two). In other embodiments, arbitrarily large subsets can also be used, allowing the prediction strength of N-tuples to be measured. It is contemplated that any measure of the predictive strength of the subset of input variables on the output variable can be used. In some embodiments, the Bayesian likelihood of the output variable given the subset of input variables. In other embodiments, different measures of the predictive strength can be used as discussed above with respect to step 204.

Once the prediction strength for each feasible subset of variables has been computed, the data set and the set of variable subsets together with their predictive strength can be passed to prediction variable set generation engine 308, which determines a prediction variable set of predetermined size by selecting those variable subsets with the highest predictive power as determined by expectation engine 306. As discussed above with respect to step 208, the prediction set size can be determined in a number of ways, and can be of predetermined or variable size.

In communication with prediction variable set generation engine 308 is pruning engine 310. It is the purpose of pruning engine 310 to remove redundant variables from the prediction variable set, as discussed above with respect to step 208. When a member of the prediction variable set is removed, pruning engine 310 may request one or more additional variables from prediction variable set generation engine 308 to replace the removed members. Once pruning engine 310 has finished, the prediction variable set includes relatively unrelated (or uncorrelated) elements.

Once the prediction variable set has been generated and pruned, it is passed, together with the input data set, to model generation engine 312, which can generate the model based on the input data set as restricted to those variables in the prediction variable set. In some embodiments, the input data set is first restricted to those variables in the prediction variable set and then passed to model generation engine 312.

As discussed above, any of a variety of modeling techniques known in the art can be used with the dimensionality-reduced data set to generate a model for predicting the output variable given the prediction data set. Because the dimensionality-reduction process has retained as much predictive power as possible, the resulting model also retains predictive power while the learning process can be completed with significantly less computation, and accordingly in significantly less time. In some embodiments, model generation engine 312 may also optimize the generated model based on execution time or statistical significance based on the input data set, as discussed above.

Once the model has been generated, it is passed, together with the holdout data set, to scoring engine 314. Because each point in the holdout data set includes values for each of the input variables as well as the output variable, the computed value of output variable (as computed by the model) can be compared to the actual value of the output variable, as discussed above with respect to step 214 of method 200. In embodiments where a minimum score is specified for a model rather than (or in addition to) a prediction set size, scoring engine 314 may communicate to prediction variable set generation engine 308 that the model is insufficiently powerful, causing additional variables to be added and the model regenerated.

Figure 4:
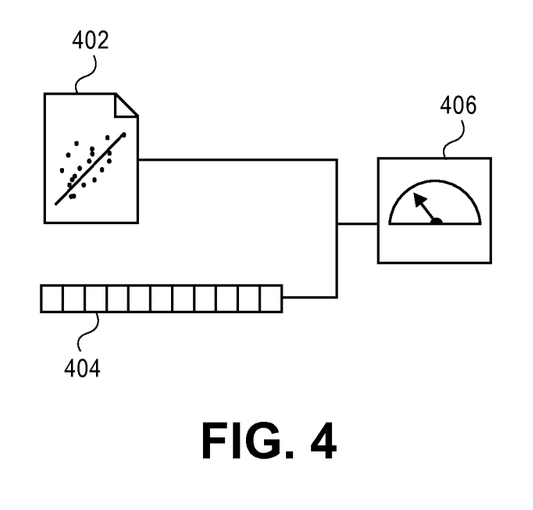
FIG. 4 depicts an exemplary system using the model generated according to embodiments of the invention.

Turning now to FIG. 4, an exemplary system using the model generated according to embodiments of the invention is depicted. Model 402, as generated by model generation engine 312, and a data point 404 are passed to evaluation engine 406. The precise form of model 402 and evaluation engine 406 will depend on the type of model that is being used. For example, if model 402 represents a neural network, then it will include the interconnection pattern between the layers of neurons, the weights for the interconnections, and the activation function that converts a neuron's inputs to its outputs. Similarly, if model 402 represents a random forest, then it will include graph representations for each of the component decision trees. In some embodiments, data point 404 has the same dimensionality as the input data set used to generate model 402. In other embodiments, it has been preprocessed so as to have the same dimensionality as the prediction variable set.

As with model 402, the precise form of evaluation engine will depend on the type of model being used. In the example above of a neural network, the evaluation of a data point may require significant computation (in the case of neural networks with a high degree feedback) or simple (in the case of feedforward networks). In the case of a random forest model, classification of a data point simply requires evaluating each decision tree in the random forest and appropriately aggregating the results. In the case of a binary output variable, the output of evaluation engine may be a binary value or a value between zero and one, representing the likelihood that the output variable is true. If the output variable is multi-valued, the output may be the value of the variable with the highest likelihood, or a probability that the output variable takes on each of the values. If the output variable is continuous, the output of the evaluation engine may be an estimated value of the output variable alone or in combination with a confidence interval, or even a probability distribution for the output variable.

Having thus described various embodiments of the invention, what is claimed as new and desired to be protected by Letters Patent includes the following:

1. A method of detecting a fraudulent tax return, comprising steps of:
   ingesting a plurality of data points, wherein each data point of the plurality of data points is associated with a tax return comprising a plurality of input variables and a fraud classification indicating whether the tax return is fraudulent or non-fraudulent;

removing input variables with a constant value across the plurality of data points from the plurality of data points;

determining, across the plurality of data points, an individual predictive strength of each input variable by comparing the input variables to the fraud classification;

wherein the individual predictive strength is determined based on a Bayesian expectation for the fraud classification given the input variable;

determining, across the plurality of data points, a pairwise predictive strength of each pair of the input variables for the fraud classification, wherein the pairwise predictive strength is a statistical measure of a relationship of each pair of the input variables to the fraud classification, wherein a high pairwise predictive strength is indicative of the pair of input variables having a strong relationship with the fraud classification, wherein the pairwise predictive strength is determined based on a conditional Bayesian expectation for the fraud classification given the pair of input variables;

determining a correlation between each pair of the input variables;

determining a prediction variable set by removing the input variable with a lowest individual predictive strength from each pair of input variables with a highest correlation until the prediction variable set is a predetermined size;

training a neural network to generate a predicted fraud score using training data comprising the prediction variable set for each data point of the plurality of data points;

receiving an input tax return from a user;

using the neural network, generating the predicted fraud score for the input tax return;

classifying, based on the predicted fraud score, the input tax return as fraudulent or non-fraudulent; and sending, to the user and based on classifying the input tax return, an indication of whether or not the input tax return is fraudulent.

2. The method of claim 1, wherein the plurality of input variables comprises at least an adjusted gross income of a taxpayer, a type of tax return, an indication of whether the tax return is itemized, a marital status of the taxpayer, a number of schedules included with the tax return, a total deduction claimed, an indication of whether the tax return was audited, and an indication of whether the tax return was determined to contain an error.

3. The method of claim 1, further comprising the step of:
determining, across the plurality of data points, an N-way predictive strength of each N-tuple of input variables for the fraud classification, and wherein the prediction variable set further comprises those N-tuples with highest predictive strengths.

4. The method of claim 3, where N=3.

5. The method of claim 1, further comprising the step of:
excluding, from the prediction variable set, one or more input variables that are present in a pair of input variables in the prediction variable set.

6. The method of claim 1, wherein the method is performed using a GPU.

7. The method of claim 1, wherein the input tax return is classified as fraudulent if the predicted fraud score is above a threshold.

8. The method of claim 1, wherein at least 500 input variables are associated with each data point.

9. The method of claim 1, wherein at least 500,000 data points are ingested.

10. A method for classifying a candidate tax return as fraudulent, comprising steps of:
submitting the candidate tax return to a model;
receiving a predicted value for a fraud score for the candidate tax return from the model;
based on the predicted value for the fraud score for the candidate tax return, classifying the candidate tax return,
wherein the model was created by a method comprising the steps of:
ingesting a plurality of data points, wherein each data point is associated with a tax return and comprises values for each of a plurality of input variables and a fraud classification indicating whether the tax return is fraudulent or non-fraudulent;
removing input variables with a constant value across the plurality of data points from the plurality of data points,
determining an individual predictive strength for each input variable by comparing a Bayesian likelihood of the fraud classification taking on a given value for different values of the input variables;
determining a pairwise predictive strength for each pair of input variables by comparing the Bayesian likelihood of the fraud classification taking on the given value for different values of the pair of input variables,
wherein the pairwise predictive strength is a statistical measure of a relationship of each pair of input variables to the fraud classification;
determining a prediction variable set by removing the input variable with a lowest individual predictive strengths from each pair of input variables with a highest correlation until the prediction variable set is a predetermined size; and
training a neural network to generate a predicted fraud score using training data comprising the prediction variable set for each data point of the plurality of data points.

11. The method of claim 10, wherein the model is a neural network.

12. The method of claim 10, wherein the prediction set is pruned prior to generating the model.

13. The method of claim 12, wherein at least one of the plurality of input variables is pruned based on inclusion in another member of the prediction variable set.

14. The method of claim 12, wherein at least one of the plurality of input variables is pruned based on a correlation coefficient with another member of the prediction variable set.

* * * * *